United States Patent Office 3,835,009
Patented Sept. 10, 1974

3,835,009
Fe-1173 ELECTRO-CHEMICAL SENSOR AND ACTIVATING METHOD THEREFOR
Gabriel G. Barna, Richardson, and Raymond J. Jasinski, Dallas, Tex., assignors to Texas Instruments Incorporated, Dallas, Tex.
Filed July 30, 1973, Ser. No. 383,941
Int. Cl. G01n 27/36, 27/46
U.S. Cl. 204—195 G        8 Claims

ABSTRACT OF THE DISCLOSURE

The disclosure relates to electro-chemical sensors for sensing gaseous nitrogen dioxide in the presence of carbon monoxide, oxygen, nitrogen, sulfur dioxide, nitric oxide and methane and in chemically compatible mixtures of these gases as well as capable of sensing gaseous materials which are more strongly oxidizing than $NO_2$, the sensor being formed from an activated non-porous Fe-1173 glass. Air oxidizing the Fe-1173 glass for 3 minutes at 300° C. activates the glass for improved sensing of gaseous nitrogen dioxide.

BACKGROUND OF THE INVENTION

Field of the Invention

This invention relates to an improvement in electro-chemical gas sensor cell system capable of continuously monitoring gaseous pollutants in ambient urban air, stack gases from power plants, automobile exhausts and the like, to determine the presence of $NO_2$ as well as more strongly oxidizing gases, such as ozone, in the presence of CO, $O_2$, $N_2$, $SO_2$, NO and $CH_4$ and chemically compatible mixtures of these gases as well as a system for determining when $NO_2$ is the specific one of the gases being sensed.

DESCRIPTION OF THE PRIOR ART

There has been a general need for low cost equipment to continuously monitor gas pollutants in ambient urban air, in stack gases for power plants, in automobile exhausts and other pollution causing sources. In the past, this type of analysis has required going through the costly and slow procedure required by the standard textbooks wherein such gases are passed through a series of liquids to remove certain ones of the gases, one at a time, and determine qualitatively and quantitatively the gases present.

The prior art has also found difficulty in monitoring low concentrations of $NO_2$ and high oxidizing gases at concentrations of 0.01 to 0.1 parts per million by volume. Prior art electro-chemical sensors have also had an inherent lack of specificity, insufficient sensitivity to monitor urban air and have been of relatively high cost. Prior art electro-chemical sensors have gained partial selectivity through the preliminary chemical treatment of the sample gas (selective diffusion through membranes).

In accordance with the invention set forth in a patent application entitled "Electro-Chemical Sensors for Trace Gas," Raymond J. Jasinski et al., filed in the U.S. Patent Office on June 18, 1973, as Ser. No. 370,898, assigned to the same assignee as the present invention, which is specifically incorporated herein by reference, there is provided an electro-chemical gas sensor cell system which is capable of determining when a gas which is as oxidizing as $NO_2$, or more strongly oxidizing, is present in a gaseous atmosphere containing CO, $O_2$, $N_2$, $SO_2$, NO and $CH_4$ and chemically compatible mixtures of these gases, which is of relatively low cost, relatively high sensitivity and capable of specifically identifying $NO_2$ both qualitatively and quantitatively. There is also provided a relatively inexpensive electro-chemical gas sensor which achieves great selectivity through the inherent properties of an activated sensor material itself. In accordance with one embodiment of that invention, there is provided an electro-chemical sensor which is composed of non-porous Fe-1173 glass capable of providing a voltage between the sensor and a reference electrode which is separated from the sensor by an electrolyte to provide an output voltage which is linearly related to the logarithm of the concentration of $NO_2$ passing over the sensor.

SUMMARY OF THE INVENTION

Pre-treatment of the sensor electrode disclosed above, so as to oxidize it in an air environment of 300° C. for 3 minutes activates the electrode for improved $NO_2$ sensing.

Moreover, it has been discovered that Fe-1173 and similar "specific ion" electrodes which have become deactivated may have their sensitive surface layers reactivated by similar high-temperature, air oxidation.

It is therefore a feature of this invention to provide an improved electro-chemical gas sensor cell capable of detecting $NO_2$ and more strongly oxidizing gases in the presence of CO, $O_2$, $N_2$, $SO_2$, NO and $CH_4$ and chemically compatible mixtures of these gases more sensitively and more rapidly than in prior art cells.

It is another feature of this invention to provide an improved method of manufacturing an electro-chemical gas sensor from a chalcogenide glass including a novel activation step that produces a sensor with improved sensing properties.

It is yet another feature of this invention to provide an improved method of reactivating a "specific ion" electro-chemical gas sensor.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawings, which drawings form a part of this specification. It is to be noted, however, that the appended drawings illustrate only a typical embodiment of the invention and are therefore not to be considered limiting of its scope, for the invention may admit to other equally effective embodiments.

In the Drawings.

DESCRIPTION OF PREFERRED EMBODIMENT

Figure 1:
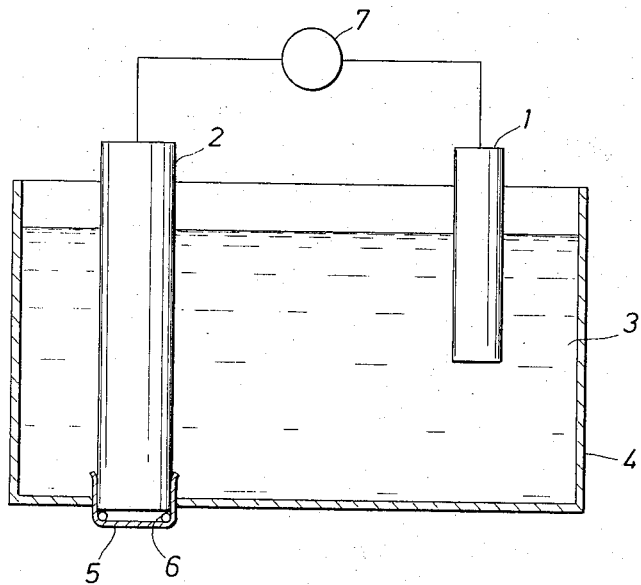
FIG. 1 is a schematic diagram of an electro-chemical gas sensor cell in accordance with a preferred embodiment of the present invention.

Gases can be quantitatively sensed through electro-chemical means by two alternate methods: potentiostatically and potentiometrically. In the potentiostatic mode, the test gas generates a current at a fixed applied potential, the current being linearly proportional to the concentration of the gas at the electrode sensor. In the potentiometric mode, the open circuit voltage is measured between a reference and a sensing electrode, this voltage being related logarithmically through the classical Nernst relationship to the concentration of gas at the sensing electrode.

In either mode of operation, the primary requirement for a gas sensor is its specificity to a particular gas or a small class of gases in a mixture of gases. The selectivity of an electro-chemical sensor cell operating in either of the above-defined modes may be changed through the permeability characteristics of the membrane placed between the electrode surface and the gas being monitored.

An additional degree of selectivity can be obtained in the potentiostatic mode through the particular value of the applied potential.

However, in the potentiometric mode, any selectivity at the electrode is a result of the inherent activity of the electrode material. The desired property is that the electrode be responsive to a single gas, or a very limited class of gases.

Methods of fabricating electrodes of Fe-1173 glass are set forth in a U.S patent application entitled "Electro-Chemical Sensors for Trace Gas," Raymond J. Jasinski et al., filed in the U.S. Patent Office on June 18, 1973 and U.S. Patent No. 3,709,813, which methods are specifically incorporated herein by reference. An electrode of such material in the potentiometric mode operating in an electro-chemical sensor cell operates satisfactorily under many conditions. However, when compared to the operation of an "activated" electrode improved in accordance with the present invention, such electrode may be referred to as "not activated."

The non-activated Fe-1173 glass sensor which is referred to above achieves a certain response which is not completely satisfactory for many commercial applications. First, the sensitivity of an electro-chemical gas sensor cell for detecting $NO_2$ in air is in the millivolt range. Any improvement is certainly desirable. More importantly, such a sensor has a response delay of several minutes. For many applications of sampling trace gases, such a lengthy delay is intolerable.

It has been discovered that the non-porous electrode made from Fe-1173 glass may be pre-treated to improve its selective response to $NO_2$. Such pre-treatment step consists of placing the electrode in an oven having an oxidizing environment of air therein at about 300° C. for about 3 minutes. Following this treatment, the electrode, when incorporated in a potentiometric system, gives surprisingly superior response to a non-activated electrode to $NO_2$ in the presence of other potentially interfering gases, such as $O_2$, NO, CO, $SO_2$ and $CH_4$. Also, $H_2O_2$ gives a more positive response, indicating an interference from ozone.

It is surprising in that it might be anticipated that other oxidizing pre-treatments of the electrode material would give the same type of improved response to $NO_2$. However, neither potentiostatic oxidation at +400 mv. (vs. Ag/AgCl) nor chemical oxidation by $H_2O_2$ or ferric ion, gave an electrode with such a substantive response to $NO_2$.

Now referring to FIG. 1, there is shown an electrochemical gas sensor cell in accordance with a preferred embodiment of the present invention. The sensor cell includes reference electrode 1 and a sensing electrode 2 spatially separated therefrom. Both electrodes make substantial electrical contact with electrolyte 3 contained within housing 4 of the cell. At the location of housing 4 opposite sensing electrode 2, there is an opening closed by flexible gas-permeable membrane 5. On top of membrane 5 are spacing elements 6, for a purpose explained below. Sensing electrode 2 depends a short distance through the opening in housing 4 and has its sensing surface somewhat cupped by membrane 5. Actually the electrode sensing surface is held from making actual contact with membrane 5 by spacing elements 6. The maintenance of a slight gap between the membrane and the sensing surface permits the electrolyte to be present in the area at all times and to make ohmic contact across the sensing surface to the electrolyte on either side. A high impedance voltmeter 7 is connected to read the potential between the electrodes. The gas to be detected by the cell is passed opposite membrane 5 to be absorbed therethrough for measurement purposes.

Sensor 2 is formed from a chalcogenide glass, one embodiment thereof being an 1173 glass which has been doped with iron, cobalt, nickel or the selenides of iron, cobalt and nickel as impurities. In addition to the description included in U.S. Pat. No. 3,709,813, the 1173 glass is fully set forth in the Journal of the Electro-Chemical Society, Volume 118, No. 4, April 1971, at pages 571–576, which is specifically incorporated herein by reference. This article indicates that such glass in its undoped form comprises 60 mole percent selenium, 28 mole percent germanium and 12 mole percent antimony. The glass in accordance with this embodiment may have small amounts of crystalline structure and will include as much of the dopant as can possibly be added without the dopant appearing in the glass as the free metal. This will provide a resistivity in the range of $10^4$ ohm-centimeters to 50 ohm-centimeters or less and preferably $10^3$ omh-centimeters or less. It has been found that for an iron impurity in the glass, the weight range of the iron is in the range of 1 to 4%. No upper limit has yet been found for the other impurities listed above. The glass is then "activated" as set forth above.

It can be seen from the above that the sensor in accordance with the described embodiment will sense any gas which is as oxidizing as $NO_2$ or more strongly oxidizing but will not be selective. The sensing of these gases by the sensor 2 is accomplished in the following manner. Referring again to FIG. 1, there is shown a voltmeter 7 connected across electrodes 1 and 2. This voltmeter will measure an increase in the voltage at electrode sensor 2 relative to the reference electrode 1 to determine whether one of the gases ($NO_2$ or $H_2O_2$) to which the sensor 2 is responsive is present is being passed by membrane 5.

Figure 2:
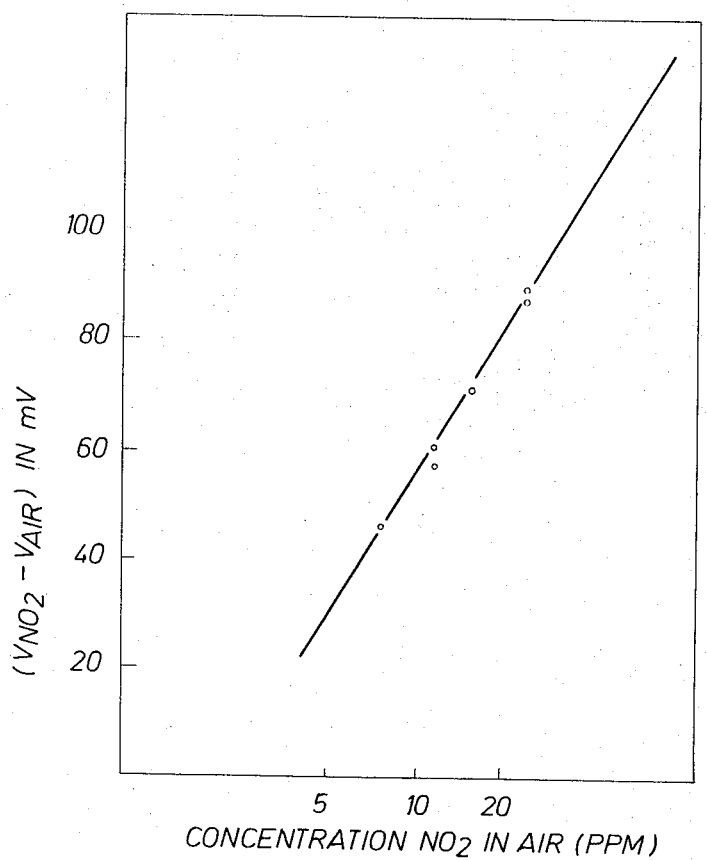
FIG. 2 is a graph of the voltage output across the sensor and reference electrode of the gas sensor of FIG. 1 in millivolts as compared with the logarithm of the concentration of $NO_2$ in air in parts per million.

FIG. 2 is a calibration curve of a normalized electrochemical gas sensor cell as set forth in FIG. 1 in millivolts for various concentrations of $NO_2$ in air in parts per million. It can be seen that the curve is linear. Experimentation shows that this curve actually extends downwardly to concentrations as low as one part per million and is still linear in that range and possible below that range. It is therefore apparent that not only can the particular gases mentioned above be tested in accordance with this procedure in a qualitative manner but also in a quantitative manner by means of the calibration curve of FIG. 2.

The specificity of the activated electrode has been tested in the laboratory and the following response has been observed:

| Sequence: | (Mv.) |
|---|---|
| $N_2$ | +38 |
| Air | 40 |
| $NO_2$ (350 p.p.m.) | 365 |
| Air | 45 |
| $SO_2$ | 48 |
| Air | 48 |
| 1% CO | 47 |

Moreover, the rate of response to $NO_2$ has been measured with non-activated and activated non-porous Fe-1173 electrodes, as described above, with all conditions other than the electrodes being identical. The results of these findings are as follows:

| Not Activated | Activated |
|---|---|
| 290 p.p.m. $NO_2$ | 290 p.p.m. $NO_2$ |
| 3 minute delay | 30 second delay |
| +58 mv. change/3 min. | +115 mv. change/3 min. |

The Fe-1173 glass electrode discussed above, and practically all similar "specific ion" electrodes, gradually deactivate as sensing elements over a period of time. Procedures often are specified for reactivating certain commercially available electrodes, since without reactivation, such electrodes soon become insensitive and must be discarded.

It has not heretofore been realized that the active portion of such an electrode is principally in the sensing surface. Reactivation of the Fe-1173 glass electrode has been achieved by first grinding off the deactivated surface. Then, the electrode is placed in an oven having an air-oxidizing environment of about 300° C. for about 3 minutes. Such reactivation has the same effect as does activation of a virgin electrode in accordance with the procedures set forth above.

While a particular embodiment of the invention has been shown, it will be understood that the invention is not limited thereto, since many modifications may be made and will become apparent to those skilled in the art.

What is claimed is:

1. An electro-chemical sensor for sensing $NO_2$ and more strongly oxidizing gases which comprises,
   (a) a first electrode formed of a chalcogenide glass oxidized in an air environment at about 300° C. for about 3 minutes,
   (b) second electrode means spaced from said first electrode,
   (c) an electrolyte contacting said first and second electrodes, and
   (d) means to measure an electrical quantity associated with said electrodes and indicative qualitatively and quantitatively of the presence of nitrogen dioxide.

2. An electro-chemical sensor as set forth in claim 1, wherein said first electrode has substantially no crystalline structure and has a resistivity in the range of from about 50 to about 10,000 ohm-centimeters.

3. An electro-chemical sensor as set forth in claim 1, wherein said first electrode is formed from an undoped glass of about 60 mole percent selenium, 28 mole percent germanium, 12 mole percent antimony.

4. An electro-chemical sensor as set forth in claim 1, wherein said first electrode is formed from a chalcogenide glass consisting of about 60 mole percent selenium, 28 mole percent germanium and 12 mole percent antimony and, as dopant, from about 1% to about 4% by weight iron.

5. An electro-chemical sensor system for sensing $NO_2$ and more strongly oxidizing gases which comprises,
   (a) a first electrode formed of a chalcogenide glass oxidized in an air environment of about 300° C. for about 3 minutes,
   (b) second electrode means spaced from said first electrode,
   (c) an electrolyte contacting said first and second electrodes,
   (d) means to measure an electrical quantity associated with said electrodes and indicative qualitatively and quantitatively of the presence of at least one of predetermined trace gases, and
   (e) means to pass gas over said first electrode.

6. Method of manufacturing an activated Fe-1173 glass electro-chemical sensor from non-activated Fe-1173 glass, which includes exposing said non-activated Fe-1173 glass to an air environment of about 300° C. for about 3 minutes.

7. Method of reactivating a deactivated Fe-1173 glass electro-chemical sensor, which comprises the steps of
   removing the deactivated sensing surface layer of the sensor, and
   exposing the deactivated Fe-1173 glass to an air environment of about 300° C. for about 3 minutes.

8. The method as set forth in claim 7, wherein removal of said deactivated sensing surface is accomplished by grinding.

References Cited
UNITED STATES PATENTS

| | | | |
|---|---|---|---|
| 3,672,990 | 6/1972 | Beck et al. | 117—201 X |
| 3,709,813 | 1/1973 | Johnson et al. | 204—195 G |
| 3,725,161 | 4/1973 | Kuper | 117—201 X |
| 3,741,883 | 6/1973 | Higashiyama et al. | 204—195 M |
| 3,766,022 | 10/1973 | Hagashiyama et al. | 204—1 T |

GERALD L. KAPLAN, Primary Examiner

U.S. Cl. X.R.

117—201, 213; 204—1 T, 195 M